US010817357B2

(12) United States Patent
Tamjidi et al.

(10) Patent No.: US 10,817,357 B2
(45) Date of Patent: Oct. 27, 2020

(54) BATCH REPRESENTATIONAL STATE TRANSFER (REST) APPLICATION PROGRAMMING INTERFACE (API)

(71) Applicant: ServiceNow, Inc., Santa Clara, CA (US)

(72) Inventors: David Tamjidi, San Diego, CA (US); Natallia Rabtsevich Rodriguez, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 304 days.

(21) Appl. No.: 15/967,223

(22) Filed: Apr. 30, 2018

(65) Prior Publication Data

US 2019/0332451 A1 Oct. 31, 2019

(51) Int. Cl.
*G06F 9/54* (2006.01)
*H04L 29/06* (2006.01)
*H04L 29/08* (2006.01)

(52) U.S. Cl.
CPC .......... *G06F 9/547* (2013.01); *H04L 63/101* (2013.01); *H04L 67/02* (2013.01); *H04L 67/42* (2013.01)

(58) Field of Classification Search
CPC ......... H04L 63/101; H04L 67/02; G06F 9/54; G06F 9/547
See application file for complete search history.

(56) References Cited

U.S. PATENT DOCUMENTS

| 6,950,943 | B1 * | 9/2005 | Bacha ............... G06F 21/6209 713/164 |
| 7,020,706 | B2 | 3/2006 | Cates et al. |
| 7,716,353 | B2 | 5/2010 | Golovinsky et al. |
| 7,769,718 | B2 | 8/2010 | Murley et al. |
| 7,925,981 | B2 | 4/2011 | Pourheidari et al. |
| 8,402,127 | B2 | 3/2013 | Solin |
| 8,612,408 | B2 | 12/2013 | Trinon et al. |
| 8,832,652 | B2 | 9/2014 | Mueller et al. |

(Continued)

FOREIGN PATENT DOCUMENTS

WO 2017074320 A1 5/2017

OTHER PUBLICATIONS

U.S. Appl. No. 16/358,276, filed Mar. 19, 2019, Swope et al.
(Continued)

*Primary Examiner* — Sher A Khan
(74) *Attorney, Agent, or Firm* — Fletcher Yoder, P.C.

(57) ABSTRACT

A disclosed method of operating a representational state transfer (REST) server to respond to receiving a batch request includes: extracting a first requested item from the batch request; opening an output stream to a client network; writing a response opening of a batch response to the output stream; writing a first response item opening of the batch response to the output stream; in response to determining that a first REST service indicated by the first requested item is authorized to be invoked based on access control lists (ACLs), invoking the first REST service to stream a first response item body of the batch response to the output stream; writing a first response item closing of the batch response to the output stream; and writing a response closing of the batch response to the output stream, wherein the batch response is in valid JavaScript Object Notation (JSON).

17 Claims, 11 Drawing Sheets

(56) References Cited

U.S. PATENT DOCUMENTS

| | | | |
|---|---|---|---|
| 9,098,322 B2 | 8/2015 | Apte et al. | |
| 9,317,327 B2 | 4/2016 | Apte | |
| 9,363,252 B2 | 6/2016 | Mueller et al. | |
| 9,645,833 B2 | 5/2017 | Mueller et al. | |
| 9,654,473 B2 | 5/2017 | Miller | |
| 9,766,935 B2 | 9/2017 | Kelkar et al. | |
| 9,805,322 B2 | 10/2017 | Kelkar et al. | |
| 10,521,195 B1 | 12/2019 | Swope et al. | |
| 10,541,961 B2 | 1/2020 | Barnard et al. | |
| 10,545,801 B2* | 1/2020 | Ruan | G06F 9/54 |
| 10,558,671 B2 | 2/2020 | Tamjidi et al. | |
| 2014/0059194 A1* | 2/2014 | Robb | G06F 9/5072 |
| | | | 709/223 |
| 2017/0104838 A1* | 4/2017 | Busayarat | H04L 41/5054 |
| 2018/0084040 A1* | 3/2018 | Moreau | H04W 80/12 |
| 2018/0324132 A1* | 11/2018 | Barnard | H04L 51/08 |
| 2018/0336523 A1* | 11/2018 | Al-Suhaimi | G06Q 10/105 |
| 2018/0338002 A1* | 11/2018 | Sherrill | H04L 63/123 |

OTHER PUBLICATIONS

U.S. Appl. No. 16/434,071, filed Jun. 6, 2019, Swope et al.
U.S. Appl. No. 16/392,260, filed Apr. 23, 2019, Tamjidi et al.
U.S. Appl. No. 16/133,438, filed Sep. 17, 2018, Nelson et al.
U.S. Appl. No. 16/784,007, filed Feb. 6, 2020, Tamjidi et al.
U.S. Appl. No. 62/502,258, filed May 5, 2017, Paul et al.
Schwingle, Todd, Bulk Updates thru Rest API, ServiceNow | Community, 2016, pp. 1-3, https://community.servicenow.com/community?id=community_question&sys_id=cbd003a5db98dbc01dcaf3231f961994.

* cited by examiner

```
<?xml version = "1.0" encoding = "UTF-8"?>
<response>
    <error>
        <detail>Failed API level ACL
Validation </detail>
        <message> User Not Authorized </message>
    </error>
    <status>failure</status>
</response>
```

FIG. 8

```
{
    "error":{
        "message":"com.glide.sys.TransactionCancelledException: Transaction
cancelled: maximum execution time exceeded",
        "detail":"Transaction cancelled: maximum execution time exceeded
Check logs for error trace or enable glide.rest.debug property to verify
REST request processing"
    },
    "status":"failure"
}
```

FIG. 9

BATCH REPRESENTATIONAL STATE TRANSFER (REST) APPLICATION PROGRAMMING INTERFACE (API)

BACKGROUND

The present disclosure relates generally to systems and methods of implementing a batch representational state transfer (REST) application programming interface (API) system.

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Any number of suitable virtual servers may cooperate to facilitate the exchange of data between various devices of the network in support of a client instance hosted by such a platform. For example, representational state transfer (REST) web services enable client devices to access server-side resources based on a set of stateless operations that are defined by the REST application programming interface (API). REST API servers generally utilize existing Hypertext Transfer Protocol (HTTP) methods (e.g., GET, POST, etc.) to receive and to respond to client requests to manipulate representations of resources.

It is presently recognized that the standard REST API does not define a batch request/response mechanism. As a result, a device having multiple operations to be performed generates multiple requests (e.g., one per operation) when communicating with a standard REST API server. For example, a client device may host and display a graphical user interface (GUI) having several user interface elements (e.g., widgets) on a start-up screen, each associated with one or more respective REST requests. When the client device communicates with the standard REST server, each REST request is separately sent to the REST server for processing. As such, it is presently recognized that there is substantial overhead due to network round trip delay, authentication delay, session setup delay, and so forth, which can prevent the GUI from loading quickly and efficiently on the client device. Additionally, devices can saturate the standard REST server with a multitude of individual REST requests that are all individually processed with increased overhead, which can have negative performance impacts that substantially reduce the overall responsiveness of the REST server to other client requests.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques generally relate to an embodiment of a batch REST API that enables multiple REST requests to be combined into a single batch request. The disclosed batch REST API enables the batch REST server to receive and process the batch request and to respond with a single batch response. As such, the disclosed batch REST system dramatically reduces overhead (e.g., network round trip delay, authentication delay, session setup delay, and so forth) by enabling multiple requested items to be combined into a single batch request. The disclosed batch REST API is substantially agnostic with respect to data provided to and received from a REST service. As such, the batch REST API enables the REST service to receive/deliver data in the type and format that it was designed to receive/deliver without modification. The batch REST API also enables streaming of both the batch REST request and the batch REST response, which reduces memory usage and latency. Additionally, the batch REST API enables enforcement of size limits for the request and the response, enforces time limits for each batch REST API transaction, and is further designed to return a valid response (e.g., in valid JavaScript Object Notation (JSON)), even when errors and/or limits are encountered when processing the batch request.

BRIEF DESCRIPTION OF THE DRAWINGS

The description herein makes reference to the accompanying drawings, wherein like reference numerals refer to like parts throughout the several views.

FIGS. 8 and 9 illustrate decoded bodies of different response items of the example batch REST response of FIG. 7, in accordance with embodiments of the present technique;

DETAILED DESCRIPTION

Figure 1:
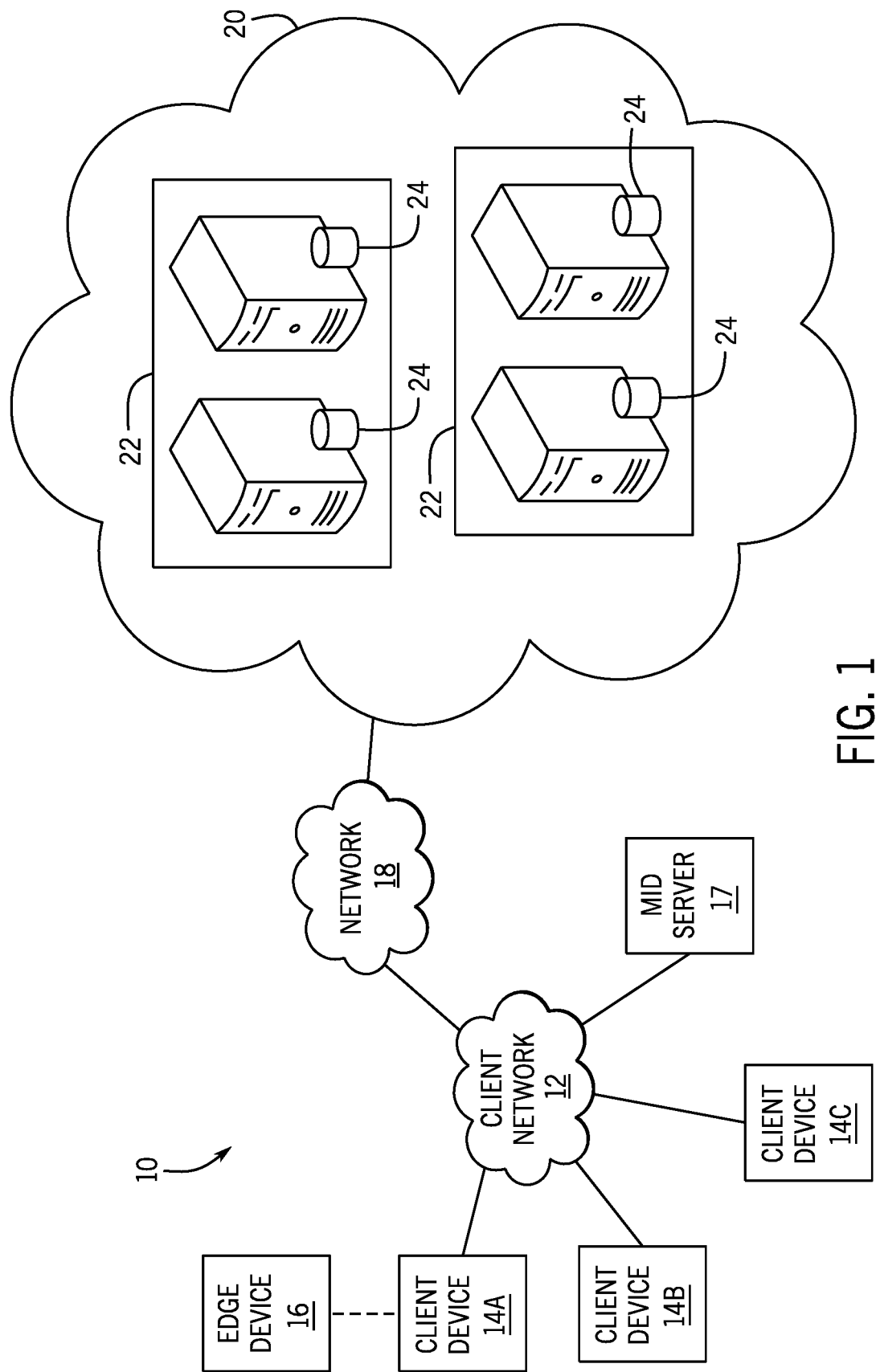
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As mentioned, the standard REST API does not support batch requests or responses. As such, when a number of queries are executed to populate an element (e.g., a widget) of a client graphical user interface (GUI), the queries are typically submitted as individual requests, each with a respective network round trip delay, authentication, session setup, etc., which can create situations in which substantial overhead can hinder performance of the system. As such, a batch REST API is presently disclosed that enables multiple REST requests to be combined into a batch request that can more efficiently be communicated to a REST server for processing. The disclosed batch REST API further enables the REST server to efficiently respond with a single batch response. Additionally, the disclosed batch REST API enables the combination of different formats (e.g., JavaScript Object Notation (JSON), Extensible Markup Language (XML)) in a single batch REST request or response, as well as streaming of both the batch request and response. In certain embodiments, the batch REST API enforces size limits for the batch REST request and the response, enforces time limits for each batch REST transaction, Furthermore, the batch REST API is designed to return a response with a valid structure, even in the event of an error during processing of one or more portions of a batch REST request.

With the preceding in mind, the following figures relate to various types of generalized system architectures or configurations that may be employed to provide services to an organization in a multi-instance framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 20, network operators may choose to configure the data centers 22 using a variety of computing infrastructures. In one embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
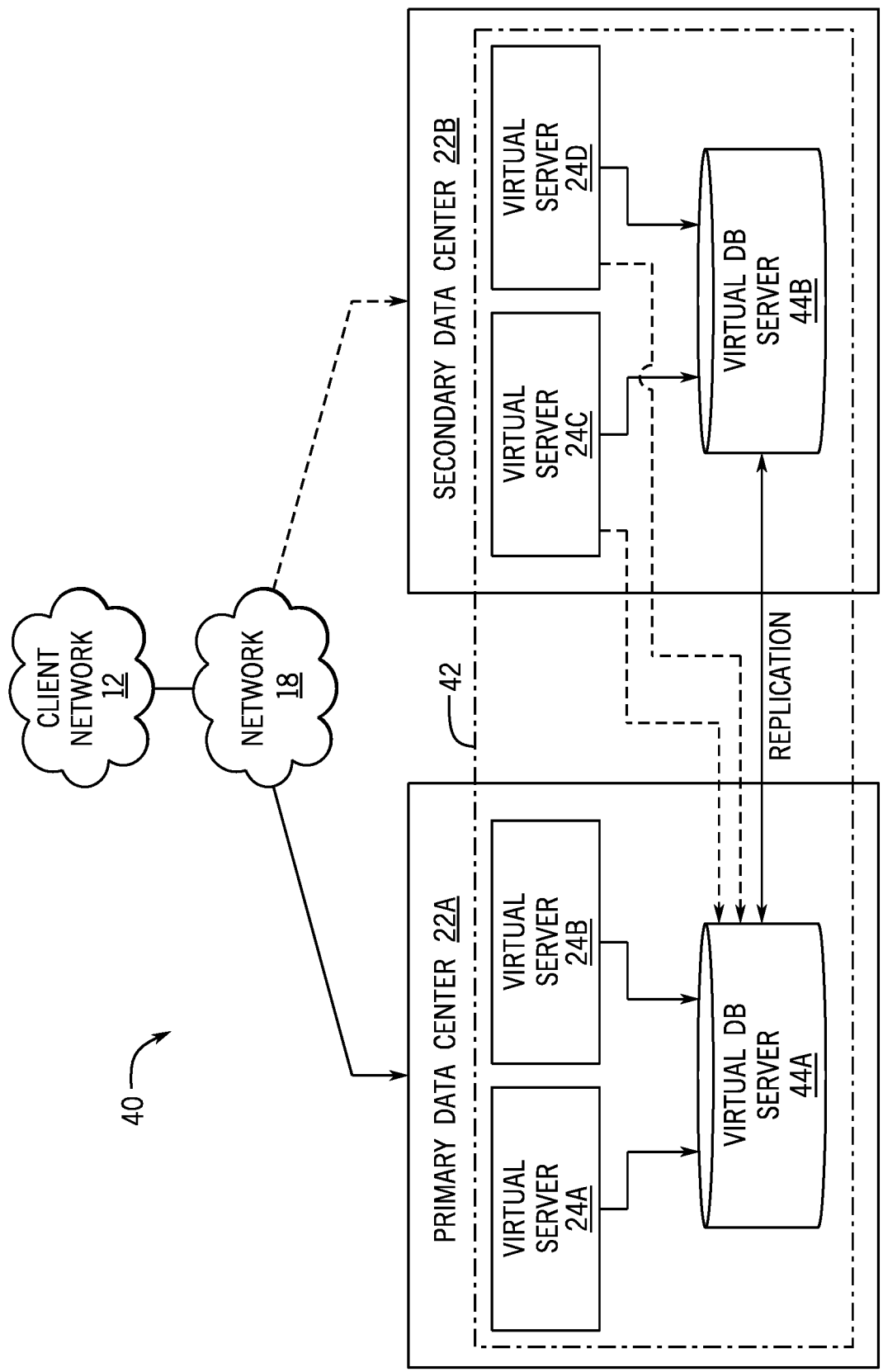
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances but are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center 22A that includes a primary pair of virtual servers 24A and 24B and the primary virtual database server 44A associated with the client instance 42, and data center 22B acts as a secondary data center 22B to back up the primary data center 22A for the client instance 42. To back up the primary data center 22A for the client instance 42, the secondary data center 22 includes a secondary pair of virtual servers 24C and 24D and a secondary virtual database server 44B. The primary virtual database server 44A is able to replicate data to the secondary virtual database server 44B.

As shown in FIG. 2, the primary virtual database server 44A may replicate data to the secondary virtual database server 44B using, e.g., a Master-Master My SQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual server into a single virtual server. Using FIG. 2 as an example, the virtual servers 24A-D and virtual database servers 44A and 44B may be combined into a single virtual server. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
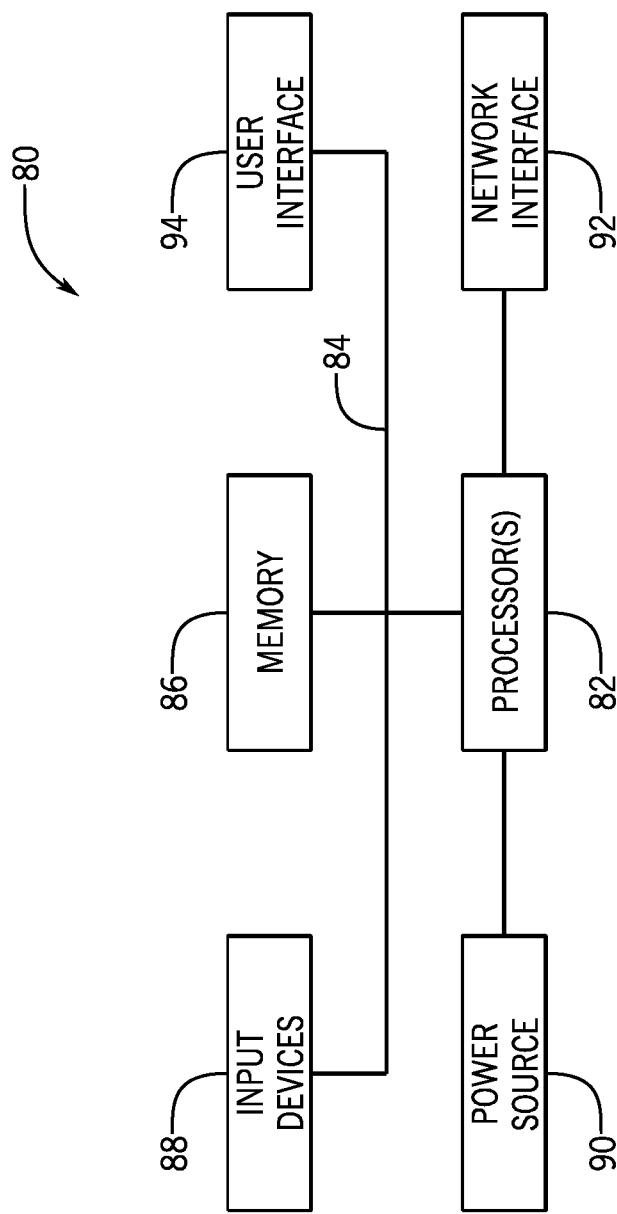
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
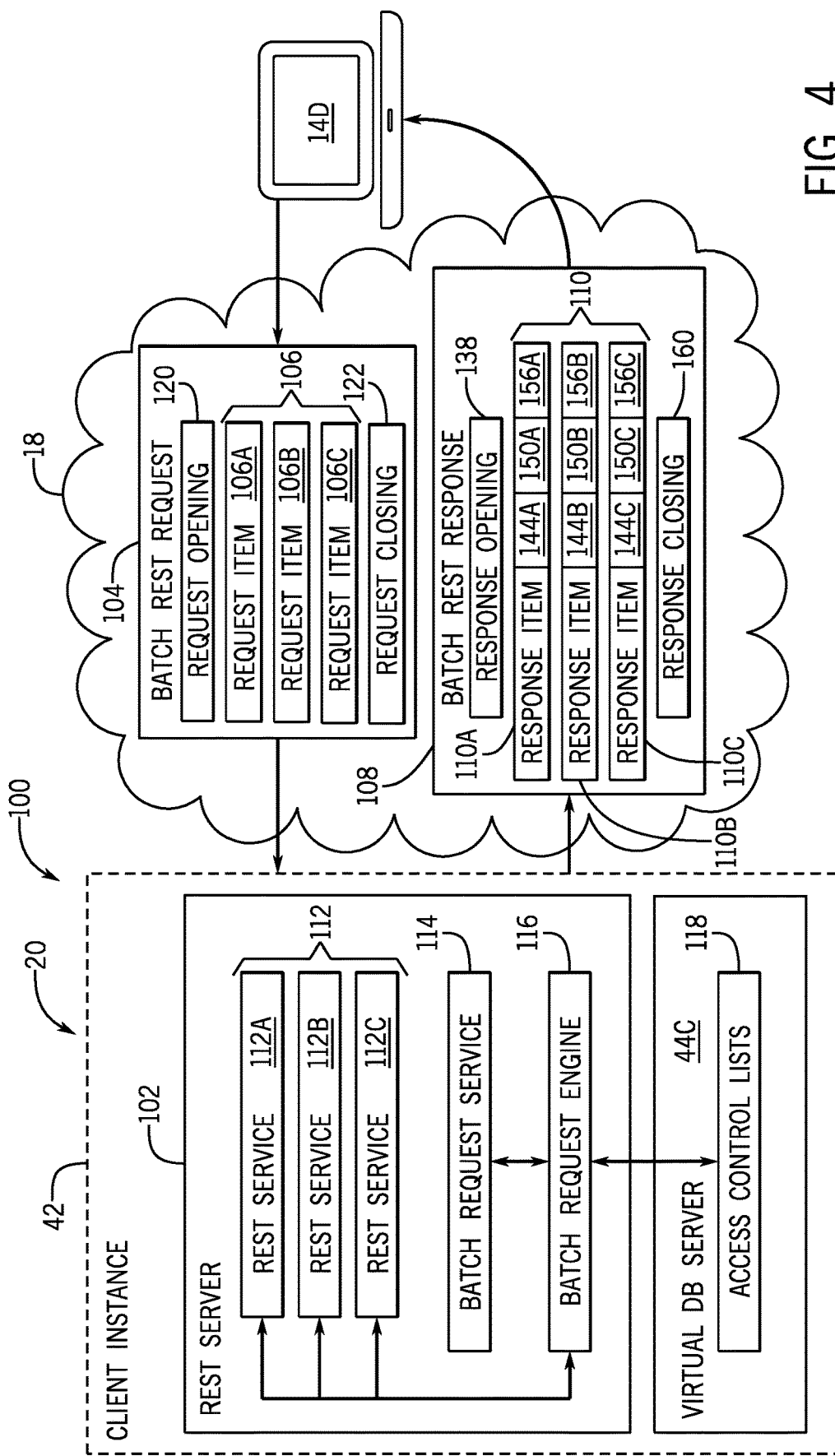
FIG. 4 is a block diagram of an embodiment of a batch REST system implemented by the cloud computing system of FIG. 1, in accordance with embodiments of the present technique.

As mentioned above, present embodiments are directed toward a batch REST API that enables a REST server to process batch REST requests that include a number of different requested items. With the foregoing in mind, FIG. 4 illustrates a batch REST system 100 (also referred to as simply "REST system") that implements the disclosed batch REST API. The disclosed REST system 100 includes a REST server 102 designed and configured to receive a batch REST request 104 that includes multiple requested items 106 (e.g., requested item 106A, 106B, and 106C), to process the requested items 106 of the batch REST request 104, and to provide a batch REST response 108 that includes multiple response items 110 (e.g., response item 110A, 110B, and 110C), in accordance with embodiments of the present technique. More specifically, FIG. 4 is a block diagram illustrating an embodiment in which a REST system 100, including the REST server 102, supports and enables the client instance 42, according to one or more disclosed embodiments. More specifically, FIG. 4 illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the batch functionality described herein within the client instance 42. Cloud provider infrastructures are generally configured to support a plurality of end-user devices, such as client device 14D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

For the embodiment of the REST system 100 illustrated in FIG. 4, the client instance 42 includes (e.g., is hosted and supported by) the REST server 102, which may be an example of virtual servers 24A-C illustrated in FIGS. 1 and 2, in accordance with the present technique. More specifically, the illustrated REST server 102 implements the batch REST API to enable the batch functionality set forth herein. For the illustrated embodiment, the REST server 102 hosts or includes a number of REST services 112 (e.g., REST Service 112A, 112B, and 112C). As discussed below, these REST services 112 can be called individually via normal, non-batch REST requests, or may be called repeatedly or in various combinations via the batch REST request 104, as discussed.

With respect to the batch REST API, the REST server 102 of the embodiment illustrated in FIG. 4 includes a batch request service 114 (e.g., "/api/now/v1/batch") that is designed and configured to receive the batch REST request 104 from the client device 14D. In certain embodiments, the batch REST request 104 may be streamed from the client device 14D to the REST server 102. The REST server 102 further includes a batch request engine 116 that is designed and configured to process (e.g., unpack and fulfill) requested items 106 of the batch REST request 104 received from the client device 14D at the batch request service 114. Additionally, as illustrated in FIG. 4, the batch request engine 116 is able to access one or more access control lists (ACLs 118) that are associated with the client instance 42. For the illustrated embodiment, the batch request engine 116 of the REST server 102 is configured to access the ACLs in one or more tables hosted by a virtual DB server 44C associated with the client instance 42. Using authorization information stored in the ACLs 118, the batch request engine 116 can determine whether a user, device, role, group, etc., associated with the batch REST request 104 is authorized to execute or call the REST services 112. As discussed below, the REST server 102 is designed to determine whether requested items 106 of the batch REST request 104 are authorized to be executed by the batch request engine 116 for the requesting client device 14D and the associated user.

Figure 5:
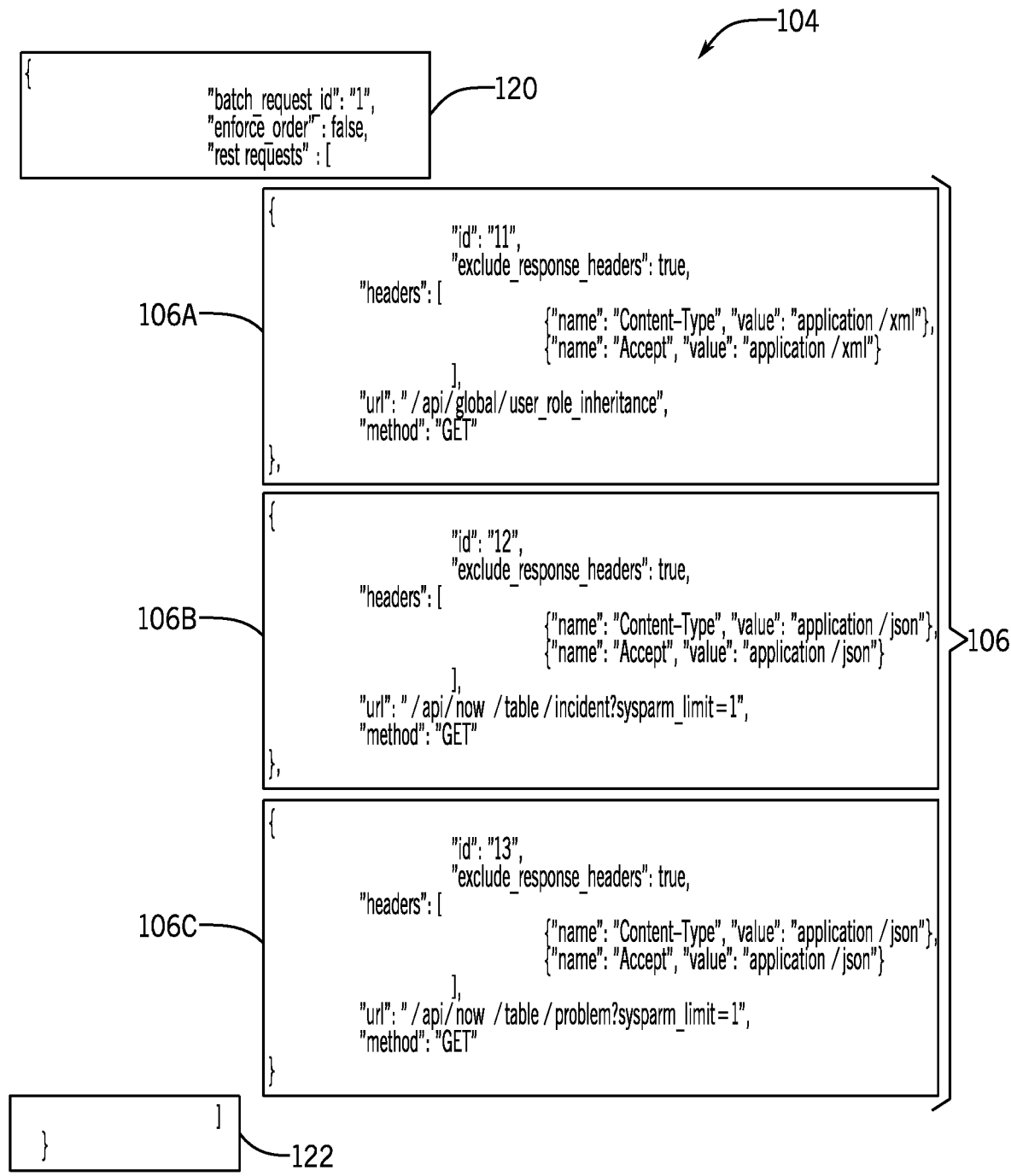
FIG. 5 is an example batch REST request, in accordance with embodiments of the present technique.

The batch REST request illustrated for the example of FIG. 4 includes a request start or opening 120, three requested items 106 (i.e., requested item 106A, 106B, and 106C), and a request end or closing 122. FIG. 5 illustrates the example batch REST request 104 of FIG. 4 in greater detail. It may be appreciated that the illustrated batch REST request 104 represents a payload portion of an HTTP request; however, the batch REST request 104 may include any suitable number of HTTP headers. In particular, the batch REST request 104 may include information regarding the identity of the requesting device and/or user in a HTTP header of the batch REST request 104.

As illustrated in FIG. 5, the opening 120 of the batch REST request 104 includes suitable notation (e.g., an open brace) to open or begin the batch REST request 104. The opening 120 of the example batch REST request 104 also includes suitable data structures in valid JSON that contain data regarding the batch REST request 104. For the example illustrated in FIG. 5, the opening 120 of the batch REST request 104 includes a "batch_request_id" field with a value of "1", and "enforce_order" field with a default value of false. The "batch_request_id" field is a user-supplied number that identifies the batch REST request 104. In certain embodiments, REST server 102 may be capable of analyzing the batch REST request 104, determining which of the requested items 106 are relatively computationally less intensive, and reordering the requested items 106 to execute the relatively less computationally intensive request items first. However, in certain embodiments, the "enforce_order" field may be set to true to instruct the REST server 102 to execute the requested items 106 only in the order indicated in the batch REST request 104.

For the illustrated example, the opening 120 of the batch REST request 104 also includes the beginning of a "rest_requests" array, which contains the requested items 106 in the JSON structure of the request. Within this data structure, each of the requested items 106 includes an "id" field, which has a user supplied identifier value that is unique among the requested items 106 and that is returned as part of the corresponding response item. Each of the requested items 106 also includes an "exclude_response_headers" field having a Boolean value specifying whether or not to exclude headers that are returned from the REST service for a particular response item. Each of the requested items 106 also includes a "headers" array that includes any suitable number of name/value pairs (e.g., corresponding to a data type) that correspond to the requested item. Also, each of the illustrated requested items 106 includes a Uniform Resource Identifier (URI) field, having a value that indicates an endpoint of the REST service being called by the requested item, and a "method" field having a value that indicates the HTTP method for submitting the requested item to the REST service indicated by the "URL" field.

For the example illustrated in FIG. 5, the batch REST request 104 includes three requested items 106. Requested item 106A includes an "id" field having a value of "11", an array of header data indicating that the desired and accepted content-type is XML, and a "URL" field indicating the endpoint of the requested REST service 112A. Requested item 106B includes an "id" field having a value of "12", an array of header data indicating the desired and accepted content-type is JSON, and a "URL" field indicating the endpoint of the requested REST service 112B. Requested item 106C includes an "id" field having a value of "13", an array of header data indicating the desired and accepted content-type is also JSON, and a "URL" field indicating the endpoint of the requested REST service 112C. Additionally, the illustrated batch REST request 104 includes a request closing 122, which includes suitable notation (e.g., close bracket, close brace) to close the "rest_requests" array opened in the opening 120 of the request, and to close the batch REST request 104 itself, such that the request 104 is in valid JSON.

Figure 6:
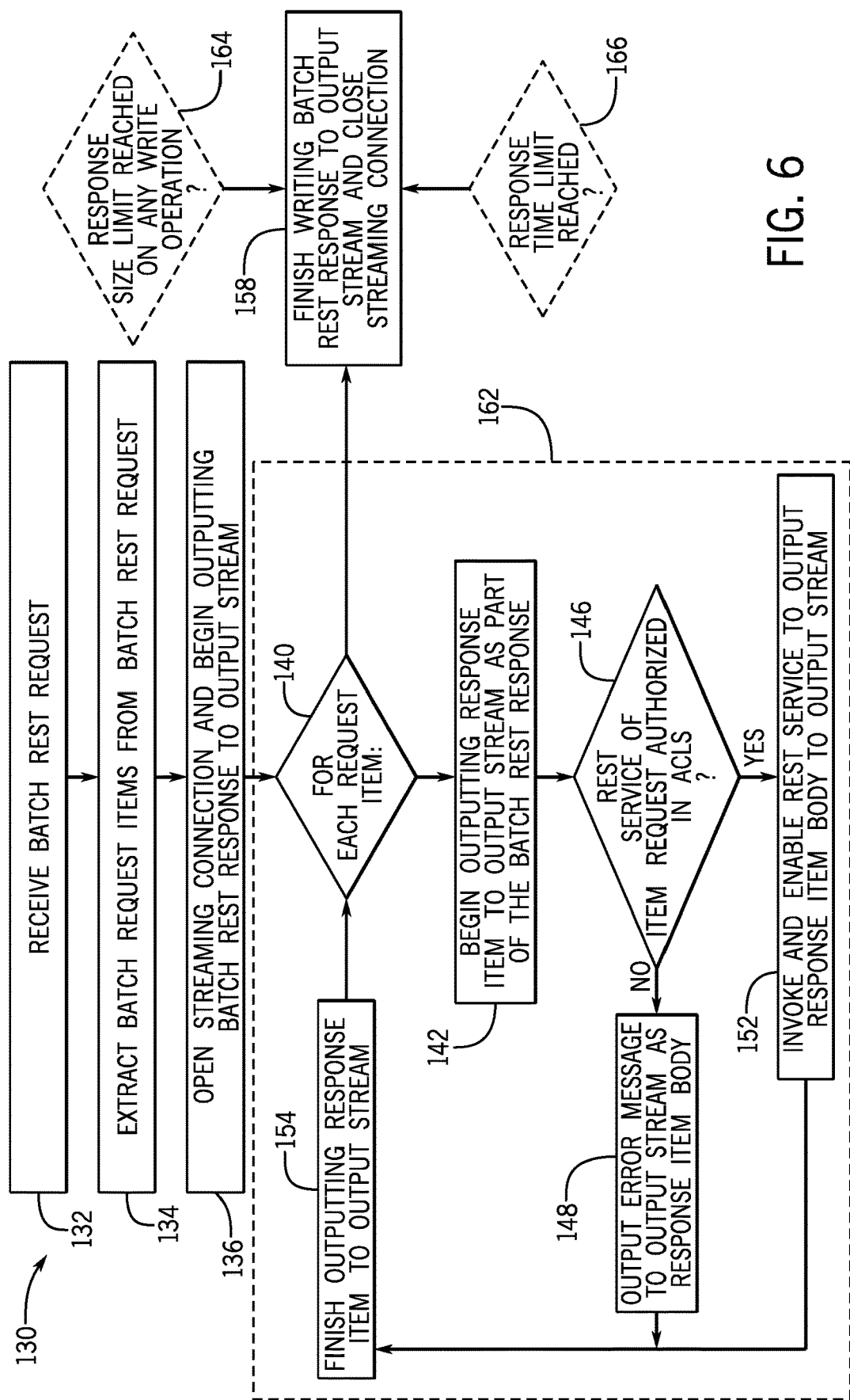
FIG. 6 is a flow diagram illustrating a process whereby the REST server of the batch REST system fulfills batch REST requests, in accordance with embodiments of the present technique.

FIG. 6 is a flow diagram illustrating an embodiment of a process 130 by which the REST server 102 implementing the disclosed batch REST API processes the batch REST request 104 and provides the batch REST response 108, in accordance with the present technique. More specifically, the process 130 may be executed by or as part of the batch request engine 116 of the REST server 102. The process 130 may be stored as instructions in a suitable medium (e.g., memory 86) and executed by suitable processor (e.g., processors 82) associated with the computing system 80 of FIG. 3 (e.g., a processor of the data centers 22 or the cloud computing system 10). Additionally, the illustrated process 130 is provided merely as an example, and in other embodiments, the process 130 may include additional steps, fewer steps, repeated steps, and/or steps performed in different orders than is illustrated in FIG. 6. While the embodiment of the process 130 describes the REST server 102 processing the batch REST request 104 from the client device 14D, in other embodiments, the batch REST request 104 may be received from, and the batch REST response 108 returned to, any suitable computing system associated with the data centers 22, the cloud computing system 10, or the client network 12. Additionally, it may be appreciated that FIG. 6 is discussed with reference to elements of FIGS. 4, 5, 7, 8, 9, 10 and 11 which illustrate an example of the present technique.

The embodiment of the process 130 illustrated in FIG. 6 begins with the batch request engine 116 receiving (block 132) the batch REST request 104 from the client device 14D. The batch REST request 104 can include any suitable number of requested items 106 (e.g., requested items 106A, 106B, and 106C). For example, in certain embodiments, a maximum number of requested items allowed in the batch REST request 104 may be defined by a particular system property (e.g., "glide.rest.batch.maxRequestItems"), which may have an adjustable default value (e.g., 1000). In certain embodiments, the batch REST request 104 may be limited in size based on the value of another system property (e.g., "glide.rest.batch.maxInputSize"), which also may have an adjustable default value (e.g., 5 megabytes (MB)). If the received batch REST request 104 is outside of one or more predefined system parameters, the batch request engine 116 may respond with an error message indicating the particular system property and value that was exceeded by the batch REST request 104. In certain embodiments, the batch REST request 104 may be otherwise validated at this step, for example, to ensure that the batch REST request 104 is suitably structured (e.g., in JSON) and that the REST services 112 identified in the request 104 exist on the REST server 102, and may return an error to the client device 14D when such an issues are identified. When the batch REST request 104 is suitably validated to proceed, the batch request engine 116 extracts (block 134) the requested items 106 from the batch REST request 104. For the illustrated example, the batch REST request 104 includes requested items 106A, 106B, and 106C, which correspond to REST services 112A, 112B, and 112C, respectively, as illustrated in FIG. 4.

Proceeding through the embodiment of the process 130 illustrated in FIG. 6, the batch request engine 116 opens (block 136) a streaming connection to the client device 14D and begins outputting the batch REST response 108 to the client device 14D via the streaming connection. For example, in certain embodiments, the batch request engine 116 creates a Java® StreamingOutput object that opens a streaming connection to the client device 14D, and then uses the object to output an opening or start of the batch REST response 108, as illustrated in FIG. 4. For the example illustrated in FIG. 4, the batch request engine 116 opens the streaming connection to the client device 14D via the network 18, and then streams the opening 138 of the batch REST response 108 to the client device 14D.

Figure 7:
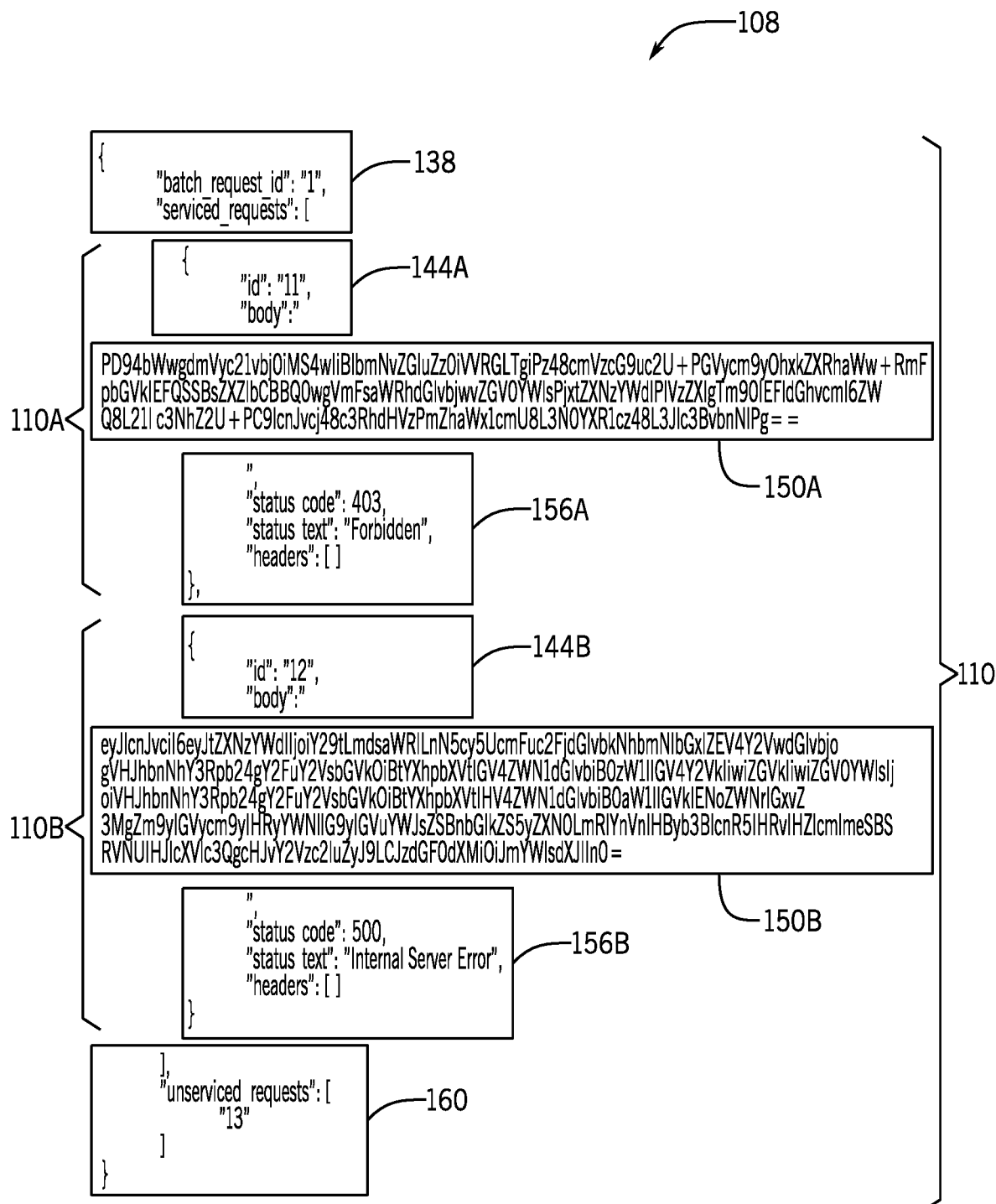
FIG. 7 is an example batch REST response, in accordance with embodiments of the present technique.

FIG. 7 illustrates an example batch REST response 108 in greater detail. More specifically, the illustrated batch REST response 108 represents a payload portion of an HTTP response; however, the batch REST response 108 may include any suitable number of HTTP headers. As discussed, since the disclosed REST server 102 is designed to return a valid JSON response, the opening 138 of the batch REST response 108 generally includes suitable notation or operators (e.g., an open brace) to open or begin the JSON object. In certain embodiments, the opening 138 may also include any suitable data structures in valid JSON containing data with respect to the processing of the batch REST request 104. For the illustrated example, the opening 138 of the batch REST response 108 includes a "batch_request_id" field having a value that corresponds to the value of the corresponding field in the batch REST request 104. The opening 138 of the illustrated batch REST response 108 also includes suitable notation to open or begin a "serviced_requests" array that contains the response items 110. In other embodiments, the opening 138 of the REST response 108 may include other fields and values (e.g., headers) indicating other information, such as a time at which the batch request engine 116 received and began to process the batch REST request 104, an identity of the REST server 102, a number of response items 110 in the batch REST response 108, a start time for processing the batch REST request 104, an identity of the client device 14D making the request (e.g., a role or group of the requester), or any other suitable information.

Returning to FIG. 6, after streaming the opening of the batch REST response 108 in block 136, the batch request engine 116 subsequently performs a number of steps for each of the requested items 106, as indicated by the "for . . . each" decision block 140. First, the batch request engine 116 begins outputting (block 142) the first response item 110A that corresponds to the first requested item 106A. For the example illustrated in FIG. 4, the batch request engine 116 uses the streaming connection to the client device 14D opened in block 136, and then streams an opening 144A of the response item 110A to the client device 14D. Like the opening 138 of the batch REST response 108, the opening 144A of the response item 110A can include suitable data structures in valid JSON that contain data regarding the processing of the corresponding requested item 106A. Turning to FIG. 7, the opening 144A of the response item 110A includes an "id" field having a value that matches the "id" field of corresponding requested item 106A, as well as any other variables storing suitable batch processing information (e.g., an execution start time, a client identity, a role of the requester). Additionally, the opening 144A of the response item 110A defines a "body" field along with suitable notation (e.g., a colon followed by an open quotation mark) to open or begin defining the value of the "body" field. As such, when the streaming connection opened in block 136 is passed to the REST service 112A, the REST service 112A can operate and output normally, while the valid JSON structure of the batch REST response 108 is maintained, as discussed below.

Continuing through the embodiment of the process 130 illustrated in FIG. 6, the batch request engine 116 determines (block 146) whether the REST service 112A indicated in the requested item 106A is authorized to be executed by the requesting client device 14D and/or the associated user in ACLs 118 associated with the client instance 42. For example, the batch request engine 116 may determine whether a user, role, or group associated with the client device 14D (e.g., based on HTTP header information of the batch REST request 104) is indicated in the ACLs 118 as having sufficient rights or privileges to execute the REST service 112A. If the batch request engine 116 determines that the REST service 112A is not authorized to be executed based on the ACLs 118, it outputs (block 148) an error message as a body 150A of the response item 110A of the batch REST response 108. For the illustrated embodiment, all of the "body" fields are encoded as base64 strings, while in other embodiments, other encodings may be used. For the example REST response 108 illustrated in FIG. 7, the body 150A of the response item 110A is a base64 encoded XML error message that is output to the batch REST response 108 as the body 150A of response item 110A in block 148. Additionally, FIG. 8 presents the decoded XML contents of the base64 encoded error message in the body 150A of the response item 110A, which indicates that the user was not authorized in the appropriate ACLs to enable the call to REST service 112A.

Turning once again to the process 130 of FIG. 6, if the batch request engine 116 determines that the REST service 112A is authorized to be executed based on the ACLs 118 in block 146, then the engine invokes (block 152) (e.g., calls, requests, executes) the REST service 112A and enables it to output the body 150A of the response item 110A as a base64 string. For example, in certain embodiments, the batch request engine 116 may call the REST service 112A and pass the streaming connection (e.g., the StreamingOutput object) created in block 136 to the service in a manner that ensures that the output is properly encoded (e.g., as a base64 string). It should be appreciated that this allows the REST service 112A to execute in a substantially similar manner as if it were called by an individual, non-batch REST request, such that REST service 112A is not required to be modified to be called by the batch request engine 116 based on the batch REST request 104. That is, since the REST service 112A is provided with the output mechanism (e.g., the Streaming-Output object), the body 150A of the response item 110A will be an encoded string (e.g., a base64 encoded string), wherein the decoded string is substantially identical to the body of a non-batch REST response to an individual, non-batch REST request to REST service 112A.

For example, in certain embodiments, each of the REST services 112 is designed and configured to receive HTTP servlet requests and provide HTTP servlet responses during operation. Accordingly, to seamlessly integrate the disclosed batch functionality into the REST system 100, the batch request engine 116 generates a dummy HTTP servlet request for each of the request items 106 of the batch REST request 104. By way of specific example, the batch request engine 116 may use the information included in batch REST request 104 (e.g., header information identifying the user) and in the request item 106A (e.g., request identifiers, headers, URL, and method) to create an instance of a dummy HTTP servlet request. As such, the REST service 112A operates substantially the same regardless of whether it is being called by an individual, non-batch REST request or by a dummy HTTP servlet request created by the batch request engine 116. The REST service 112A may execute and the output of the REST service 112A is encoded as a base64 string and streamed to the client device 14D via the previously defined output mechanism as the output is generated. For a batch REST request, the REST service 112A may also return information regarding its execution to the batch request engine 116 via the dummy HTTP servlet response (e.g., including status codes, status text, headers), and the batch request engine 116 adds some or all of this information to various fields of the response item 110A.

It may be appreciated that accessing the REST services 112 in this manner enables the batch request engine 116 to be agnostic as to the types and structure of data that is output from the REST service 112A, since the data output by these services, regardless of type or structure, is simultaneously encoded as a base64 string and streamed to the client device 14D. More specifically, for present embodiments, the output stream that is passed to the REST service 112A for output is a base64 encoding output stream that both encodes the data output by the REST service 112 "on the fly" and streams the encoded data to the client device 14D via the network 18 as part of the batch REST response 108. As such, whether the output of the REST service 112A is typically in a particular format (e.g., an XML format, JSON format, binary format, etc.), for present embodiments, the output of the REST service 112A is encoded in base64 and streamed to the client device 14D, as it is generated, to form the body 150A of the response item 110A of the batch REST response 108. It should be appreciated that, by using a base64 encoding output stream, the output of the REST service 112A is encoded and streamed to the client device 14D as it is generated, reducing memory usage of the REST service 112A and the REST server 102. It should also be appreciated that the present design enables client applications (e.g., user interface widgets) to utilize batch REST requests and responses with only minimal modification (e.g., adding a step to decode the base64 string) since the data types and formats within the decoded body 150A of the response item 110A are unchanged. As such, the disclosed batch REST system is a powerful solution that offers a substantial reduction in overhead with limited modification to the REST system 100.

Turning once again to the process 130 of FIG. 6, regardless of whether the REST service 112A was invoked (in block 152) or the error message was output as the body 150A of the response item 110A, the batch request engine 116 finishes outputting (block 154) the first response item 110A. For example, the batch request engine 116 uses the streaming connection to the client device 14D opened in block 136, and then streams a closing 156A (or ending) of the response item 110A to the client device 14D. As illustrated in FIG. 7, the closing 156A of the response item 110A generally includes suitable notation (e.g., close quotation mark followed by a comma) to close or end the definition the value of the "body" field that was opened in block 142. Additionally, like the opening 144A, the closing 156A of the response item 110A can include suitable data structures in valid JSON containing data regarding the processing of the requested item 106A. For example, as illustrated in FIG. 7, the closing 156A of the response item 110A may include fields and values for status codes, status messages, error codes, headers, and so forth, with data regarding the processing of the requested item 106A.

For the embodiment of the process 130 illustrated in FIG. 6, the batch request engine 116 repeats the "for . . . loop" indicated by block 140 until all requested items 106 have been fulfilled or until a limit has been reached, as discussed below. For the illustrated example, the batch request engine 116 attempts to proceed again through the steps of blocks 142, 146, 148 or 152, and 154, to process requested item 106B and 106C, as described for requested item 106A above. As discussed below, not all of the requested items 106 may be fulfilled if a limit is encountered while processing the batch REST request 104.

Once all of the requested items 106 have been processed or a limit has been reached, then the process 130 concludes with the batch request engine 116 finishing outputting (block 158) the batch REST response 108. Like the opening 138, a closing 160 of the batch REST response 108 can include suitable data structures in valid JSON containing data regarding the processing of the batch REST request 104. For example, as illustrated in the example of FIG. 7, the closing 160 of the batch REST response 108 defines an "unserviced_requests" array that includes corresponding "id" field values for requested items 106 that were not fulfilled. Additionally, the closing 160 of the batch REST response 108 includes any suitable notation (e.g., close bracket) to close or end the JSON object defined in the batch REST response 108.

Additionally, the embodiment of the process 130 illustrated in FIG. 6 includes error handling that addresses situation in which one or more limits are reached when processing the batch REST request 104. For the illustrated process 130, as generally indicated by the dashed rectangle 162, one or more limits may be reached while processing the requested items 106. For example, in certain embodiments, a maximum allowable size of the batch REST response 108 may be defined by a particular system property (e.g., "glide.rest.batch.max.outputSize"), which may have an adjustable default value (e.g., 10 MB). In certain embodiments, this limit may be further modified to a value less than that of the particular system property based on a value included (e.g., as a header) in the batch REST request 104. As indicated by the dashed decision block 164, if either output size limit is reached during processing of the requested items 106, the batch request engine 116 responds by discontinuing further execution of the requested items 106, and proceeding to finish outputting the batch REST response 108 (block 158). Similarly, in certain embodiments, a maximum execution time for the batch REST request 104 may be defined by a particular system property (e.g., "glide.rest.batch.max.executionTime"), which may have an adjustable default value (e.g., 30 seconds). As indicated by the dashed decision block 166, if the execution time limit is reached during processing of the requested items 106, the batch request engine 116 responds by discontinuing further execution of the requested items 106, and proceeding to finish outputting the batch REST response 108 (block 158). These output size and execution time limits are provided as examples, and in other embodiments, other limits may be used. In certain embodiments, the batch request engine 116 may add an error message that serves as the body of a response item based on a limit being reached during the processing of the corresponding request item. Additionally, in block 158, the batch request engine 116 ensures that any opened structures within the batch REST response 108 are appropriately closed such that the response remains in valid JSON, even if errors are encountered while processing the requested items 106 of the batch REST request 104.

For the example REST response 108 illustrated in FIG. 7, the body 150B of the response item 110B is a base64 encoded JSON error message that is output to response item 110B in block 158. More specifically, during the execution of requested item 106B, the response time limit (e.g., 30 seconds) was reached for the illustrate example. As a result, in block 158, the batch request engine 116 outputs the base64 encoded JSON error message as the body 150B of the response item 110B in block 158. Additionally, in block 158, the batch request engine 116 may ensure that suitable notation (e.g., closing quotes, commas, closing brackets) is added to the REST response 108 to provide suitable closing 156B of the response item 110B and a suitable closing 160 of the batch REST response 108 in JSON. Additionally, in block 158, the batch request engine 116 adds an "unserviced_requests" array as part of the closing 160 of the REST response 108, as illustrated in FIG. 7. The illustrated "unserviced_requests" array includes corresponding "id" field values for any of the requested items 106 that were not fulfilled because a limit was reached while processing the batch REST request 104. FIG. 9 presents the decoded JSON contents of the base64 encoded error message that is the body 150B of response item 110B, which indicates that the transaction was canceled because the maximum execution time was exceeded. Accordingly, in FIG. 7, the "unserviced_requests" array includes the "id" field value of "13", indicating that, since the second request item 106B was interrupted for exceeding the maximum execution time, request item 106C was not processed by the REST server 102.

Figure 10:
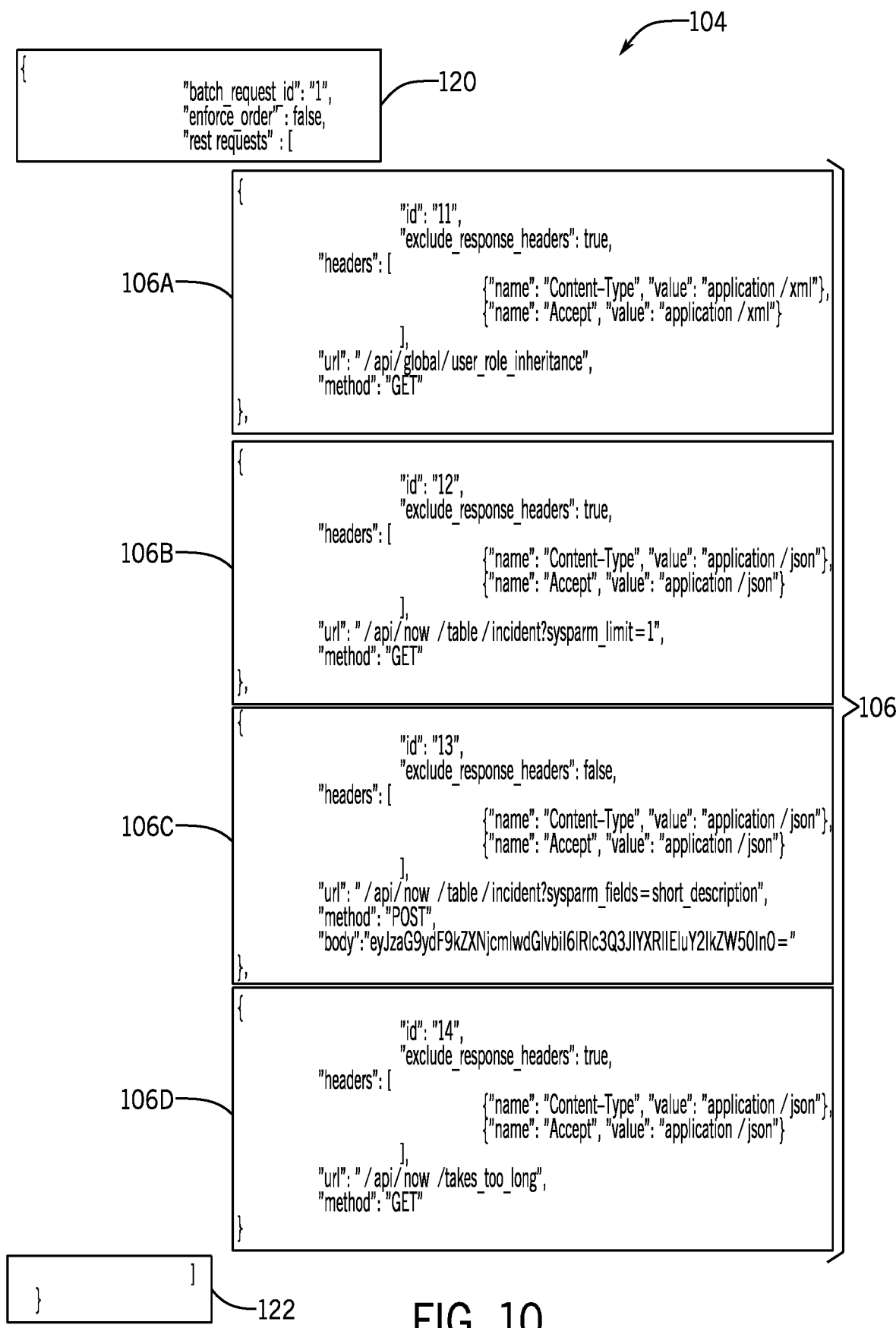
FIG. 10 is another example batch REST request, in accordance with embodiments of the present technique.

FIG. 10 illustrates another example batch REST request 104, in accordance with present embodiments. Like the example of FIG. 5, the example batch REST request 104 of FIG. 10 represents the payload portion of an HTTP request, and the batch REST request 104 may include any suitable number of HTTP headers (not shown). Additionally, the batch REST request 104 of FIG. 10 includes a number of features discussed above with respect to FIG. 5, while certain differences are highlighted below.

As illustrated in FIG. 10, the batch REST request includes the request opening 120, the request items 106, and the request closing 122. The opening 120 includes a "batch_request_id" field with a value of "1", an "enforce_order" field with a value of false, and defines the beginning of a "rest_requests" array, which contains the requested items 106 in the JSON structure of the request. Within this data structure, each of the requested items 106 includes an "id" field, an "exclude_response_headers" field, a "headers" array, a "URL" field, and a "method" field.

More specifically, for the example illustrated in FIG. 10, the batch REST request 104 includes three requested items 106. Requested item 106A includes an "id" field having a value of "11", an array of header data indicating that the desired and accepted content-type is XML, and a "URL" field indicating the endpoint of the requested REST service 112A. Requested item 106B includes an "id" field having a value of "12", an array of header data indicating the desired and accepted content-type is JSON, and a "URL" field indicating the endpoint of the requested REST service 112B. Requested item 106C includes an "id" field having a value of "13", an "exclude_response_headers" field having a value of false, an array of header data indicating the desired and accepted content-type is also JSON, and a "URL" field indicating the endpoint of the requested REST service 112C. Furthermore, unlike request items 106A and 106B, the request item 106C in FIG. 10 has a "method" field value of "POST", as well as a "body" field that includes a base64 encoded string to submit as the body for the POST of the REST service 106C (after being subsequently decoded) when processing this request item 106C. Requested item 106D includes an "id" field having a value of "14", an array of header data indicating the desired and accepted content-type is JSON, and a "URL" field indicating the endpoint of a requested REST service.

Figure 11A:
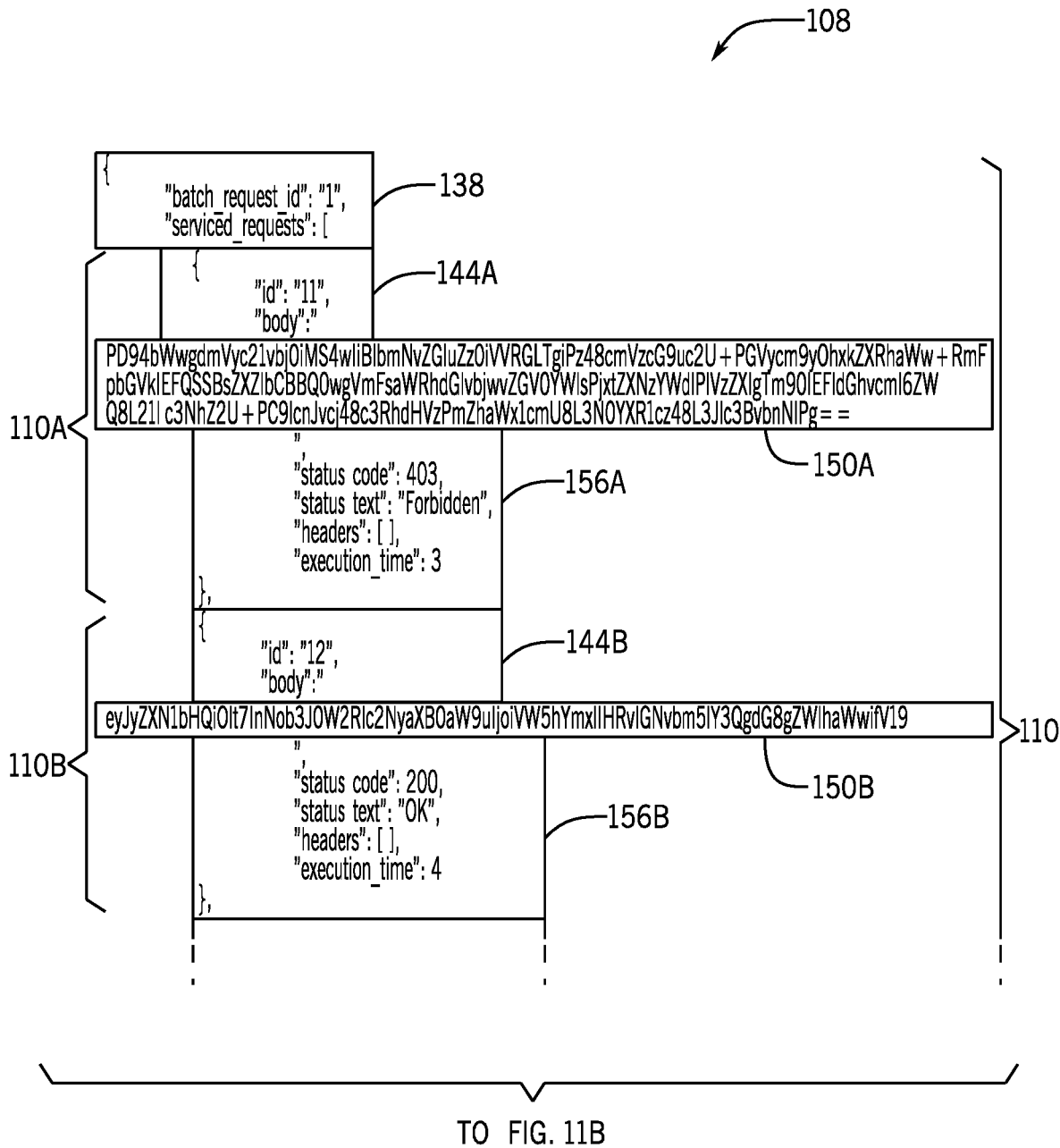
FIGS. 11A and 11B present another example batch REST response, in accordance with embodiments of the present technique.
Figure 11B:
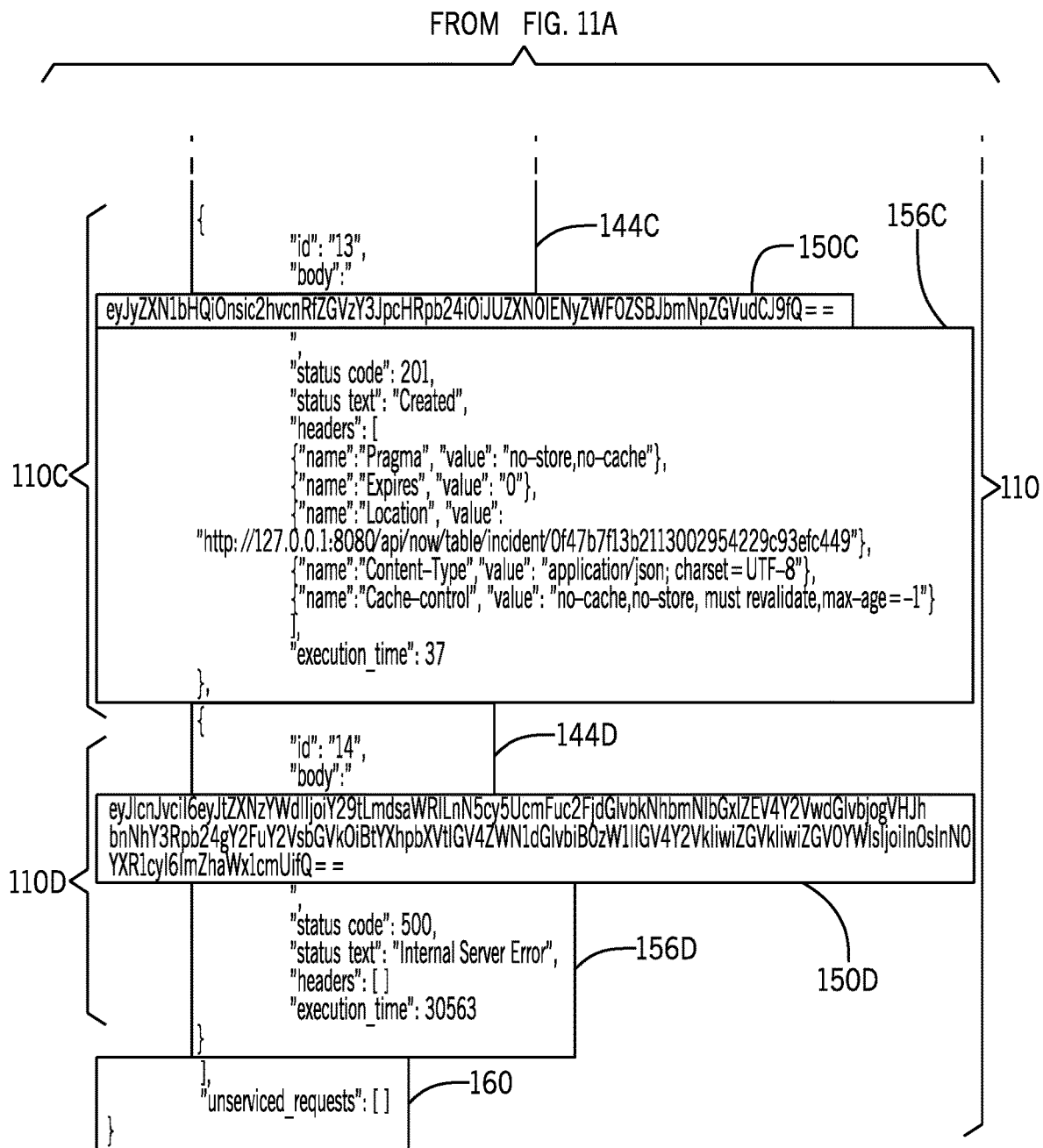

FIGS. 11A and 11B together illustrate another example batch REST response 108 which may be provided to the client device 14D in response to the batch REST request 104 of FIG. 10, in accordance with present embodiments. The batch REST response 108 of FIGS. 11A-B includes a number of features discussed above with respect to FIG. 7, while certain differences are highlighted below. The batch REST response 108 generally includes the response opening 138, the response items 110 (i.e., response items 110A, 110B, and 110C), and the request closing 122. For the illustrated example, the opening 138 of the batch REST response 108 includes a "batch_request_id" field, and includes suitable notation to open or begin a "serviced_requests" array that contains the response items 110.

For the embodiment illustrated in FIGS. 11A-B, the opening 144A of the response item 110A includes an "id" field having a value of "11" and suitable notation to begin defining the value of the "body" field. For this example, because the batch request engine 116 determines that the REST service 106A is not authorized to be invoked by the requester (e.g., in block 146 of FIG. 6), the body 150A of the response item 110A is a base64 encoded XML error message that is output by the REST service 106A (e.g., in block 148 of FIG. 6). The corresponding decoded XML, error message of the body 150A of the response item 110A is illustrated in FIG. 8. The closing 156B of the response item 110B includes a "status_code" field having a value of "403", a "status_text" field having a value of "Forbidden." Furthermore, the closing 156A includes an "execution_time" field having a value of "3", indicating an execution time of 3 milliseconds for request item 106A.

For the embodiment illustrated in FIGS. 11A-B, the opening 144B of the response item 110B includes an "id" field having a value of "12" and suitable notation to begin defining the value of the "body" field. The body 150B of the response item 110B is a base64 encoded JSON object that is output by the REST service 112B (e.g., in block 152 of FIG. 6). The closing 156B of the response item 110B includes a "status_code" field having a value of "200", a "status_text" field having a value of "OK," and an "execution_time" field having a value of "4".

For the embodiment illustrated in FIGS. 11A-B, the opening 144C of the response item 110C includes an "id" field having a value of "13" and suitable notation to begin defining the value of the "body" field. The body 150C of the response item 110C is a base64 encoded JSON object that is output by the REST service 112C (e.g., in block 152 of FIG. 6). The closing 156B of the response item 110B includes a "status_code" field having a value of "201", a "status_text" field having a value of "Created," and an "execution_time" field having a value of "37". Additionally, since the corresponding request item 106C included the "exclude_response_headers" value set to "false", the closing 156C of the response item 110C includes a "header" array that is populated with header data (e.g., "Pragma", "Expires", "Location") generated by the REST service 112C in response the request item 106C.

For the embodiment illustrated in FIGS. 11A-B, the opening 144D of the response item 110D includes an "id" field having a value of "14" and suitable notation to begin defining the value of the "body" field. Since, for this example, the maximum execution time limit was reached while processing last request item 106D (e.g., in block 158 of FIG. 6), the body 150D of the response item 110D is a base64 encoded JSON error message that is output the batch request engine 116. The corresponding decoded JSON error message is illustrated in FIG. 9. The closing 156D of the response item 110D includes a "status_code" field having a value of "500", a "status_text" field having a value of "Internal Server Error," and an "execution_time" field having a value of "30563". Since the maximum execution time was encountered while processing the last request item, the "unserviced_requests" array in the closing 160 of the batch REST response 108 is empty.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
   memory circuitry configured to store instructions of a representational state transfer (REST) server and at least one access control list (ACL) storing authorizations to invoke a REST service; and
   processing circuitry configured to execute the stored instructions to implement the REST server, wherein the REST server is in communication with a client network and hosts a first and a second REST service, wherein the processor circuitry is configured to perform operations in response to receiving a batch request from the client network, the operations comprising:

extracting a first requested item and a second requested item from the batch request;
   opening an output stream to the client network;
   writing a response opening to the output stream;
   writing a first response item opening of a batch response to the output stream;
   in response to determining that the first REST service indicated by the first requested item is authorized to be invoked based on the at least one ACL, invoking the first REST service;
   in response to determining that an execution time limit or a response size limit has been reached while processing the first requested item, discontinuing execution of the first requested item and writing a base64 encoded error message to the output stream as a first response item body of the batch response;
   writing a first response item closing of the batch response to the output stream;
   writing a second response item opening of the batch response to the output stream;
   in response to determining that the second REST service indicated by the second requested item is authorized to be invoked based on the at least one ACL and that the execution time limit or the response size limit was not reached while processing the first requested item, invoking the second REST service to stream a second response item body of the batch response to the output stream;
   writing a second response item closing of the batch response to the output stream; and
   writing a response closing of the batch response to the output stream in valid JavaScript Object Notation (JSON), wherein, when the execution time limit or the response size limit was reached while processing the first requested item, the response closing comprises an unserviced request array that includes a request identifier for the second requested item.

2. The system of claim 1, wherein the batch request comprises a request opening, the first requested item, the second requested item, and a request closing.

3. The system of claim 2, wherein the request opening comprises a request identifier and defines an array of requested items of the batch request.

4. The system of claim 2, wherein the first and second requested item each respectively comprise a requested item identifier, an array of headers, a Uniform Resource Identifier (URI), and an Hypertext Transfer Protocol (HTTP) method.

5. The system of claim 1, wherein the batch request and the batch response are both in valid JavaScript Object Notation (JSON).

6. The system of claim 1, wherein the processing circuitry is configured to perform operations comprising:
   in response to determining that the first REST service indicated by the first requested item is not authorized to be invoked based on the at least one ACL, writing, to the output stream, an encoded error message as the first response item body of the batch response; and
   in response to determining that the second REST service indicated by the second requested item is not authorized to be invoked based on the at least one ACL, writing, to the output stream, the encoded error message as the second response item body of the batch response.

7. The system of claim 1, comprising a client device coupled to the REST server via the client network, wherein the client device is configured to:

send the batch request to the REST server;
receive the batch response from the REST server; and
present at least a portion of the batch response via a user interface element.

8. A method of operating a representational state transfer (REST) server to respond to receiving a batch request from a communicatively coupled client network, the method comprising:
extracting a first requested item and a second requested item from the batch request;
opening an output stream to the client network;
writing a response opening of a batch response to the output stream;
writing a first response item opening of the batch response to the output stream;
in response to determining that a first REST service indicated by the first requested item is authorized to be invoked based on at least one access control list (ACL) accessible to the REST server, invoking the first REST service to write a first response item body of the batch response to the output stream;
writing a first response item closing of the batch response to the output stream;
writing a second response item opening of the batch response to the output stream;
in response to determining that a second REST service indicated by the second requested item is authorized to be invoked based on the at least one ACL, invoking the second REST service to write a second response item body of the batch response to the output stream;
writing a second response item closing of the batch response to the output stream; and then
writing a response closing of the batch response to the output stream, wherein the batch response is in valid JavaScript Object Notation (JSON).

9. The method of claim 8, wherein the response opening of the batch response comprises a request identifier having a value received in the batch request and defines an array of response items of the batch response.

10. The method of claim 9, wherein the response closing of the batch response comprises an array of unserviced requests and includes valid JSON notation to close the array of response items and the batch response.

11. The method of claim 8, wherein the first response item opening of the batch response comprises a response item identifier.

12. The method of claim 8, wherein the first response item body of the batch response comprises a base64 encoded string.

13. The method of claim 12, wherein the base64 encoded string of the first response item body is base64 encoded JSON, Extensible Markup Language (XML), or binary.

14. The method of claim 8, wherein the first response item closing includes information related to invoking the first REST service, wherein the information comprises a status code, a status text, and an array of headers returned from invoking the first REST service.

15. A non-transitory, computer-readable medium storing instructions executable by a processor of a computing system to enable a representational state transfer (REST) server, the instructions comprising:
instructions to receive a batch request from a communicatively coupled client network, wherein the batch request comprises:
a request opening that includes a request identifier and an array of requested items of the batch request;
the first requested item, including: a requested item identifier, an array of headers, a Uniform Resource Identifier (URI), and a Hypertext Transfer Protocol (HTTP) method; and
a request closing that includes suitable notation to close the array of requested items and the batch request in valid JavaScript Object Notation (JSON);
instructions to open an output stream to the client network and to write a response opening of a batch response to the output stream;
instructions to extract a first requested item from the batch request;
instructions to write a first response item opening of the batch response to the output stream;
instructions to invoke a first REST service to stream a first response item body of the batch response to the output stream when the first REST service indicated by the first requested item is authorized to be invoked based on at least one access control list (ACL) accessible by the REST server;
instructions to write a first encoded error message as the first response item body of the batch response to the output stream when the first REST service indicated by the first requested item is not authorized to be invoked based on the at least one ACL;
instructions to write a first response item closing of the batch response to the output stream; and
instruction to write a response closing of the batch response to the output stream, wherein the batch response is in valid JSON.

16. The medium of claim 15, comprising:
instructions to extract a second requested item from the batch request;
instructions to write a second response item opening of the batch response to the output stream after writing the first response item closing to the output stream;
instructions to invoke a second REST service to write a second response item body of the batch response to the output stream when the second REST service indicated by the second requested item is authorized to be invoked based on the at least one ACL;
instructions to write a second encoded error message as the second response item body of the batch response to the output stream when the second REST service indicated by the second requested item is not authorized to be invoked based on the at least one ACL; and
instructions to write a second response item closing of the batch response to the output stream before writing the response closing to the output stream.

17. The medium of claim 16, wherein the batch response comprises:
the response opening, including: the request identifier of the batch request, and an array of response items;
the first response item opening, including a response item identifier;
the first response item body, including a base64 encoded string;
the first response item closing, including: a status code, a status text, and an array of headers; and
the response closing, including an array of unserviced requests.

* * * * *